United States Patent
Han et al.

(10) Patent No.: US 9,503,857 B2
(45) Date of Patent: Nov. 22, 2016

(54) METHOD AND APPARATUS FOR PROVIDING LOCATION INFORMATION IN MOBILE DEVICE

(71) Applicant: Samsung Electronics Co. Ltd., Suwon-si, Gyeonggi-do (KR)

(72) Inventors: Huntaek Han, Yongin (KR); Dohyoung Chung, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 233 days.

(21) Appl. No.: 13/972,126

(22) Filed: Aug. 21, 2013

(65) Prior Publication Data

US 2014/0057649 A1 Feb. 27, 2014

(30) Foreign Application Priority Data

Aug. 21, 2012 (KR) ........................ 10-2012-0090992

(51) Int. Cl.
*H04W 24/00* (2009.01)
*H04W 4/02* (2009.01)

(52) U.S. Cl.
CPC .................................. *H04W 4/025* (2013.01)

(58) Field of Classification Search
CPC ... H04W 4/20; H04W 64/003; H04W 84/06; G01S 19/46; G01S 19/258; G01S 19/29; G01S 19/31; G01S 19/41; G01S 19/48; G01S 5/0027; G01S 5/0263; G01C 21/206
USPC .................. 455/404.2, 456.1–456.6
See application file for complete search history.

(56) References Cited

U.S. PATENT DOCUMENTS

| 7,006,037 B2 | 2/2006 | Kim |
| 2004/0116134 A1* | 6/2004 | Maeda et al. .................. 455/457 |
| 2005/0164714 A1* | 7/2005 | Tang-Taye ............ H04W 64/00 455/456.5 |
| 2007/0049295 A1* | 3/2007 | Soliman et al. ........... 455/456.3 |
| 2010/0079332 A1* | 4/2010 | Garin ...................... G01S 19/08 342/357.64 |
| 2010/0203899 A1* | 8/2010 | Sheynblat et al. ......... 455/456.1 |

FOREIGN PATENT DOCUMENTS

| JP | 09-229694 | 9/1997 |
| KR | 10-2004-0100607 A | 12/2004 |

\* cited by examiner

*Primary Examiner* — Mazda Sabouri
*Assistant Examiner* — Edward Zhang
(74) *Attorney, Agent, or Firm* — Jefferson IP Law, LLP

(57) ABSTRACT

A method of location information in a mobile device capable of improving position accuracy of the mobile device using a database (DB) of peripheral auxiliary data when GPS and navigation are performed in the mobile device, and an apparatus thereof is provided. The method of providing location information in a mobile device includes acquiring initial location information of the mobile device when a location based service is executed, transmitting the acquired initial location information to a server, receiving auxiliary data corresponding to the initial location information from the server, classifying satellites to be used to determine a location with reference to the auxiliary data, and determining the location based on a satellite signal of a satellite having a high weight through the classification of the satellites.

13 Claims, 8 Drawing Sheets

METHOD AND APPARATUS FOR PROVIDING LOCATION INFORMATION IN MOBILE DEVICE

PRIORITY

This application claims the benefit under 35 U.S.C. §119(a) of a Korean patent application filed on Aug. 21, 2012 in the Korean Intellectual Property Office and assigned Serial No. 10-2012-0090992, the entire disclosure of which is hereby incorporated by reference.

BACKGROUND OF THE INVENTION

1. Field of the Invention

The present invention relates to a method and an apparatus for providing location information in a mobile device. More particularly, the present invention relates to a method of providing location information in a mobile device capable of improving position accuracy of the mobile device using a DataBase (DB) of peripheral auxiliary data when Global Positioning System (GPS) and navigation are performed in the mobile device, and an apparatus thereof.

2. Description of the Related Art

In recent years, with the development of digital technology, various mobile devices such as a mobile communication terminal, a Personal Digital Assistant (PDA), an electronic notebook, a smart phone, a tablet PC (Personal Computer), etc., capable of processing communication and personal information while a user is moving, are introduced. Such mobile devices have developed in the midst of the mobile convergence stage and thus function to provide the traditional mobile communication field and also function to provide other advanced fields. For example, the mobile device may provide various functions such as an audio call, an image call, transmission of a message such as a Short Message Service (SMS)/Multimedia Message Service (MMS) message, an electronic note, capturing a photograph, e-mail transception, broadcasting playback, moving image playback, Internet, electronic commercial transaction, music playback, schedule management, Social Networking Service (SNS), a friend finder service, messenger, dictionary, and the like.

More particularly, the mobile device provides a Location Based Service (LBS) such as a location positioning function and a navigation function. The LBS is a technology that determines a location of a mobile device using a signal of a base station or a satellite of a mobile communication network and provides various information services associated with the location. In order to use the LBS, it is essential to determine a location of the mobile device. In this case, a technology of determining the location of the mobile device refers to a wireless positioning technology. The wireless positioning technology may be classified into a network based scheme using a base station signal and a satellite based scheme using a Global Navigation Satellite System (GNSS) signal. The GNSS is referred to as a satellite positioning system of each country. For example, the GNSS may include GPS of USA, Global Navigation Satellite System (GLONASS) of Russia, and European Satellite Navigation System (GALILEO) of Europe.

The network based scheme has a hearing ability problem during a signal propagation procedure, and has difficulty in exactly measuring a transfer time due to failure through a multi-path generated from the environment such as a building or the ground. Recently, in order to exactly measure a location of the mobile device, the satellite based scheme has been mainly used rather than the network based scheme.

That is, since the satellite based scheme uses a satellite signal, the satellite based scheme may increase accuracy as compared with the network based scheme. However, the location may not exactly be known in a zone where the satellite signal cannot be received, for example, a location underground or inside of a building. More particularly, in a case of the satellite based scheme, failure through a multi-path from the building may occur in a city. Accordingly, exact location information of the mobile device may not be provided.

In more detail, in the GNSS, as described above, a mobile device receives a satellite signal from a satellite such as a GPS or a GLONASS to determine a pseudo-range between the satellite and the mobile device. The GNSS determines a location of a mobile device using a triangulation principle based on a pseudo-range measured from four or more satellites and location information of respective satellites. The GNSS determines a pseudo-range between the mobile device and the satellite on the assumption that line of sight between the mobile device and the satellite is ensured.

However, the mobile device cannot determine whether a satellite signal it currently receives is a multi-path signal reflected by peripheral buildings. Thus, position accuracy is deteriorated due to biased pseudo-range information when using a satellite signal that propagates through a multi-path Accordingly, there is a need for an improved apparatus and method for providing location information in a mobile device using data on peripheral buildings.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method of providing location information in a mobile device using data on peripheral buildings, and an apparatus thereof.

Another aspect of the present invention is to provide a method of providing location information in a mobile device which may acquire auxiliary data (e.g., building information) corresponding to peripheral buildings in a current location of the mobile device, and identify a received multi-path signal from satellite signals with reference to the acquired auxiliary data, and an apparatus thereof.

Another aspect of the present invention is to provide a method of providing location information in a mobile device which may identify a received multi-path signal from satellite signals using auxiliary data corresponding to a current location of the mobile device, and determine a location of the mobile device through suitable filtering with respect to the identified multi-path satellite signal to improve position accuracy in a city, and an apparatus thereof.

Another aspect of the present invention is to provide a method of providing location information in a mobile device which may implement an optimal environment to determine position accuracy when providing a location based service such as Global Positioning System (GPS) and navigation of the mobile device, and an apparatus thereof.

In accordance with an aspect of the present invention, a method of providing location information in a mobile device is provided. The method includes acquiring initial location information of the mobile device when a location based service is executed, transmitting the acquired initial location information to a server, receiving auxiliary data corresponding to the initial location information from the server, classifying satellites to be used to determine a location with reference to the auxiliary data, and determining the location based on a satellite signal of a satellite having a high weight through the classification of the satellites.

There is also provided a computer readable recording medium recording a program for executing the method by a processor.

In accordance with another aspect of the present invention, a mobile device is provided. The mobile device includes a location determination module for receiving a satellite signal to acquire initial location information of the mobile device and to determine a location of the mobile device, a radio frequency communication unit for processing transmission of the initial location information and reception of auxiliary data corresponding to the initial location information, a memory for storing relation information and a threshold necessary to determine a location, and a controller for acquiring the auxiliary data corresponding to the initial location information of the mobile device, for classifying satellites to be used to determine a location with reference to the auxiliary data, and for controlling determination of the location based on a satellite signal of a satellite having a high weight through the classification of the satellites.

In accordance with another aspect of the present invention, a mobile device is provided. The mobile device includes a radio frequency communication unit for performing wireless communication with the server, a location detector for acquiring the initial location information of the mobile device, a satellite filter for generating satellite information according to a sight line ensuring satellite in which a line of sight is ensured and a sight line non-ensuring satellite to which a multi-path signal is transferred, a density determination unit for determining a density of peripheral buildings corresponding to the initial location information using the auxiliary data, a satellite signal measuring unit for measuring a satellite signal using the initial location information from the location detector and the satellite signal from the satellite filter, and a location determination unit for determining a current location of the mobile device with reference to measuring information of the satellite signal from the satellite signal measuring unit and density information.

In accordance with still another aspect of the present invention, a system for providing location information is provided. The system includes a mobile device for acquiring schematic initial location information in a current location when a location based service is executed, for receiving auxiliary data corresponding to the initial location information from a server, and for determining a location according to a sight line ensuring satellite and a sight line non-ensuring satellite with reference to the auxiliary data, and a server for extracting the auxiliary data corresponding to the initial location information of the mobile device when the initial location information is received.

In accordance with yet another aspect of the present invention, a computer readable recording medium is provided. The computer readable recording medium records a program for acquiring auxiliary data corresponding to initial location information of a mobile device, for applying different weights to a sight line ensuring satellite and a sight line non-ensuring satellite with reference to the auxiliary data, for determining a satellite to be used to determine a location according to the weights applied to the sight line ensuring satellite and the sight line non-ensuring satellite, and for determining the location.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
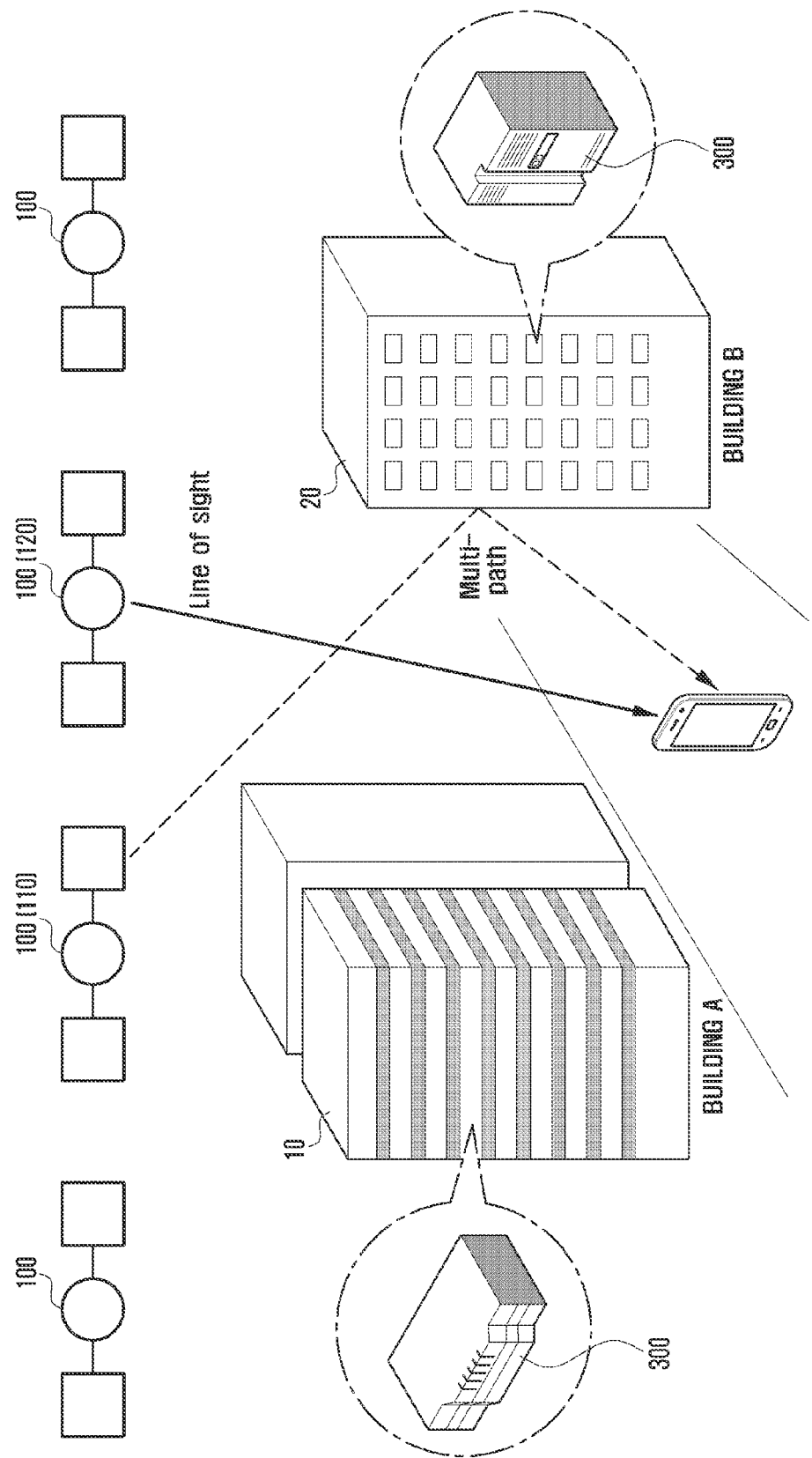
FIG. 1 is a conceptual diagram schematically illustrating an operation according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention relate to a method and an apparatus for providing location information for a Location Based Service (LBS) of a mobile device. An exemplary embodiment of the present invention suggests a method of providing location information in a mobile device capable of improving position accuracy of the mobile device using a DataBase (DB) of auxiliary data, and an apparatus thereof.

In an exemplary implementation, the auxiliary data identifies a satellite signal (i.e., satellite) received through a multi-path channel (e.g., reflected by a peripheral building) among satellite signals received from satellites when providing a location service using a satellite of the mobile device, and reduces dependency with respect to the identified satellite signal upon determination of the location to increase position accuracy. The auxiliary data may be managed by a server implemented in a peripheral building in which the mobile device is currently located. The auxiliary data may include information on peripheral buildings based on a current location, information on a location, an area, a height, and light reflectivity of the buildings, three-Dimensional (3D) building information, and information on peripheral topography objects.

When the mobile device performs the LBS such as a location positioning function and a navigation function in a city, an exemplary embodiment of the present invention may identify a satellite signal received through a multi-path in a current location of the mobile device among satellite signals of a Global Navigation Satellite System (GNSS). Exemplary embodiments of the present invention may identify a multi-path satellite signal using auxiliary data provided from a server included in a building that is peripheral to the location of the mobile device. Further, the mobile device may suitably filter the identified multi-path satellite signal to compensate for a location error caused by the multi-path. Accordingly, when the mobile device performs location positioning and navigation in a city, more exact location information of the mobile device may be provided.

FIG. 1 is a conceptual diagram schematically illustrating an operation according to an exemplary embodiment of the present invention.

Referring to FIG. 1, a communication system may include a GNSS satellite 100, a mobile device 200, and one or more servers 300 implemented in peripheral buildings 10 and 20.

The GNSS refers to a satellite positioning system of each country. For example, the GNSS may include a Global Positioning System (GPS) of USA, Global Navigation Satellite System (GLONASS) of Russia, and European Satellite Navigation System (GALILEO) of Europe.

The mobile device 200 receives a signal from a satellite 100 which is located at a medium earth orbit at altitude of about 20,000 Km and may know location information with a predetermined distance (e.g., 100 m). In general, since a plurality of satellites 100 pass through earth's atmosphere at different orbits, a mobile device 200 may receive at least four signals at different times and locations. That is, the mobile device 200 may receive satellite signals from at least four satellites. Further, the mobile device 200 measures a time taken when a signal from the satellite 100 reaches the mobile device 200 to obtain a distance between the satellite 100 and the mobile device, and determines a current location of the mobile device 200 through the obtained distance.

As described above, in the GNSS, the mobile device 200 receives a signal provided from the satellite 100 to measure a pseudo-range between the satellite 100 and the mobile device 200. The mobile device 200 determines its location by triangulation using the pseudo-range and location information of a satellite measured from at least four satellites 100. In implementation, the positioning scheme measures a pseudo-range between the mobile device 200 and the satellite 100 on the assumption that line of sight exists between the mobile device 200 and the satellite 100 as illustrated between the satellite 120 and the mobile device 200 in FIG. 1.

However, as illustrated in FIG. 1, a signal between the mobile device 200 and a satellite 110 may be a multi-path signal that is reflected from a building B 20 before it reaches the mobile device 200. However, the mobile device 200 may not be aware of whether a currently received satellite signal is a multi-path signal or a directly received signal. Accordingly, as illustrated in FIG. 1, when the mobile device 200 uses the received multi-path satellite signal to determine a location, failure occurs in measuring a pseudo-range due to time error until the signal is reflected and received, and accordingly position accuracy may be deteriorated.

Accordingly, an exemplary embodiment of the present invention may be implemented as a server (e.g., server 300) for broadcasting a DataBase (DB) of auxiliary data. Furthermore, the server may be included in a building (e.g., building A 10, building B 20). In an exemplary implementation, the mobile device 200 receives auxiliary data from the server 300 and may identify a satellite signal received through a multi-path using the received auxiliary data. Accordingly, the mobile device 200 performs suitable filtering in which the identified satellite signal is excluded to determine the location or correcting an error range to improve location accuracy. That is, the auxiliary data of peripheral buildings is received from the server 300 to perform filtering in order to measure a satellite signal with respect to each satellite 100, and determine a location using the filtered information. Further, the mobile device stores the auxiliary data from the server 300 in a current location to establish a DB.

Hereinafter, an exemplary configuration of the mobile device and a method of controlling an operation of the same will be described with reference to the accompanying drawings.

Figure 2:
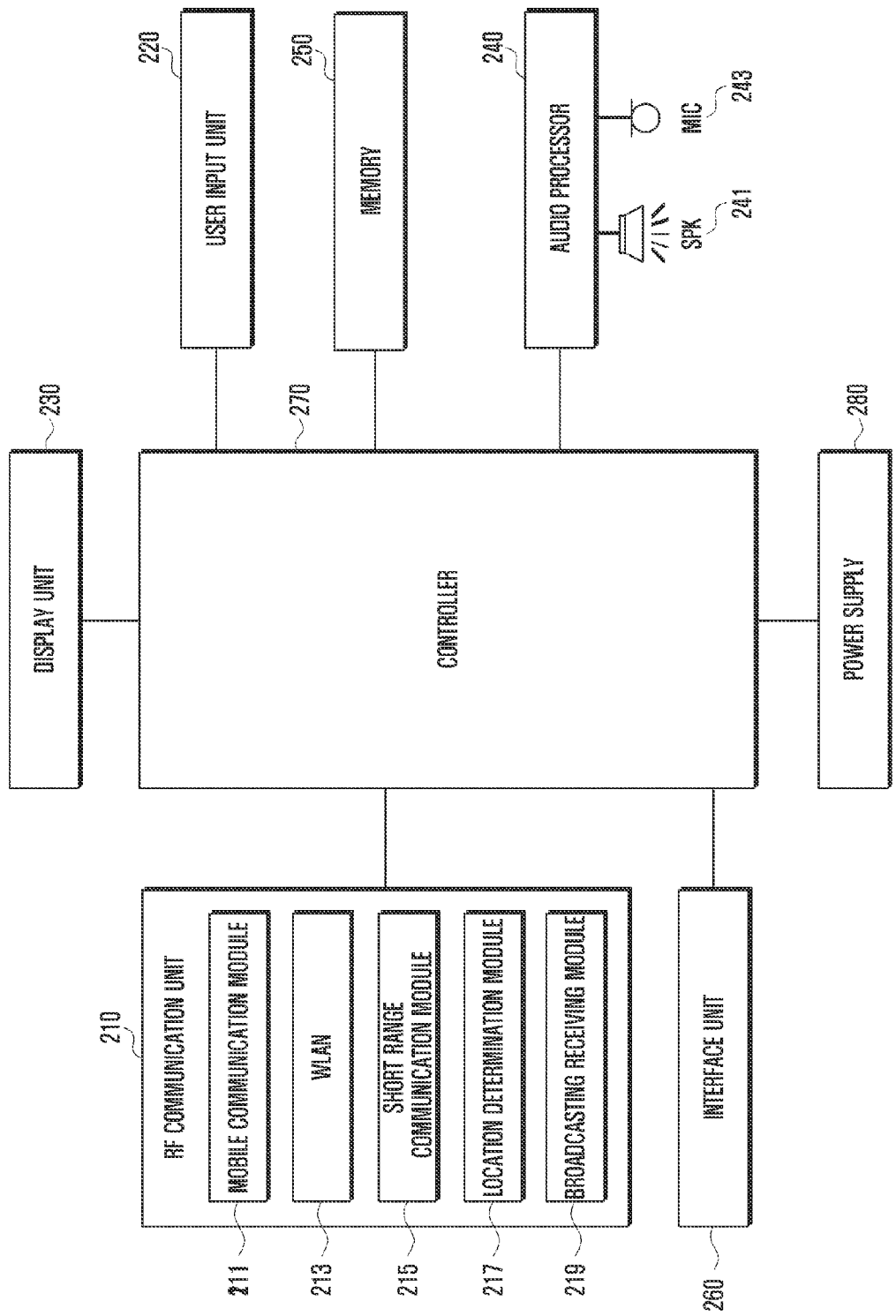
FIG. 2 is a block diagram schematically illustrating a configuration of a mobile device according to an exemplary embodiment of the present invention.

FIG. 2 is a block diagram schematically illustrating a configuration of a mobile device according to an exemplary embodiment of the present invention.

Referring to FIG. 2, the mobile device 200 include a Radio Frequency (RF) communication unit 210, a user input unit 220, a display unit 230, an audio processor 240, a memory 250, an interface unit 260, a controller 270, and a power supply 280. Since constituent elements shown in FIG. 2 are not essential, a mobile device 200 of the present invention having more or less constituent elements may be implemented.

The RF communication unit 210 may include at least one module capable of performing wireless communication between the mobile device 200 and a wireless communication system or between the mobile device 200 and a network in which another mobile device is located. For example, the RF communication unit 210 may include a mobile communication module 211, a Wireless Local Area Network (WLAN) module 213, a short range communication module 215, a location determination module 217, and a broadcasting receiving module 219.

The mobile communication module 211 transceives a wireless signal with at least one of a base station, an external terminal, a server (e.g., contents server, etc.), and the like over a mobile communication network. The wireless signal may include data of various formats according to transception of a speech call signal, an image call signal, a character/multimedia message, etc. The mobile communication module 211 connects with an external contents server to download various contents according to user selection under control of the controller 270.

The WLAN module 213 may be a module for wireless access to the Internet, and forming a WLAN link with other portable terminal, and may be installed at an inside or outside of the portable terminal. Wireless Internet techniques may include Wireless LAN/Wi-Fi (WLAN), Wireless broadband (Wibro), World Interoperability for Microwave Access (WIMAX), High Speed Downlink Packet Access (HSDPA), etc. The WLAN module 213 connects with a specific server in a current location to transmit initial location information corresponding to the current location and to receive auxiliary data corresponding to the initial location information.

The short range communication module 215 is a module for short range communication. The short range communication techniques may include Bluetooth, Radio Frequency Identification (RFID), Infrared Data Association (IrDA), Ultra Wideband (UWB), ZigBee, etc. When connecting using short range communication with another mobile device, the short range communication module 215 may transmit or receive contents according to a user selection to or from the other mobile device.

The location determination module 217 is a module for determining (e.g., acquiring) a location of the portable terminal. For example, the location determination module 217 may include GPS related components. The location determination module 217 may determine distance information relative to at least three base stations and time information, and use the determined information in a triangulation method such that three-dimensional current location information according to latitude, longitude, and altitude is determined. The location determination module 217 may continuously receive a current location of the mobile device 200 from at least three satellites to determine location information. The location information of the mobile device 200 may be acquired by various schemes. A configuration and an operation of the location determination module 215 according to exemplary embodiments of the present invention will be described later.

The broadcasting receiving module 219 receives a broadcasting signal (e.g., TV broadcasting signal, radio broadcasting signal, data broadcasting signal) and/or information (e.g., broadcasting channel, broadcasting program or information about a broadcasting service provider) from an external broadcasting management server through a broadcasting channel (e.g., satellite channel, terrestrial channel).

The user input unit 220 generates input data for controlling an operation of the portable terminal. The user input unit 220 may be configured by a key pad, a dome switch, a touch pad (resistive/capacitive type), a jog wheel, a jog switch, etc. The user input unit 220 may be provided outside the mobile device 200 in the form of a button. Some buttons may be implemented by a touch panel.

The display unit 230 displays (outputs) information processed by the portable terminal. For example, when the portable terminal is in a call mode, the display unit 330 displays a User Interface (UI) or a Graphical UI (GUI) associated with a call. When the mobile device 200 is in a video call mode or an image shooting mode, the display unit 230 displays a captured and/or received image or a UI or a GUI. More particularly, the display unit 230 may display various UIs and GUIs associated with an operation of an LBS. That is, the display unit 230 may display location information determined upon operation of the LBS.

The display unit 230 may include at least one of a Liquid Crystal Display (LCD), a Thin Film Transistor-Liquid Crystal Display (TFT LCD), a Light-Emitting Diode (LED), an Organic Light-Emitting Diode (OLED), an Active Matrix OLED AMOLED), a flexible display, a bended display, a 3D display, etc. Moreover, some of the above displays may be implemented as a transparent display.

According to exemplary embodiments of the present invention, when a touch panel detecting a touch operation forms a layer structure with the display unit 230 (hereinafter referred to as 'touch screen'), the display unit 230 may be used as an input device as well as an output device. The touch panel converts pressure applied to a specific part or a variation in capacitance created at the specific part of the display unit 230 into an electric input signal. The touch panel may detect a touched location or area, and a pressure of the touch. When there is a touch input with respect to the touch panel, a corresponding signal(s) is sent to a touch controller (not shown). The touch controller processes the signal(s) and transmits corresponding data to the controller 270. Accordingly, the controller 270 may recognize which region of the display unit 230 is touched.

The audio processor 240 transmits an audio signal from the controller 270 to a speaker 241, and transfers an audio signal such as a voice from the microphone 243 to the controller 270. The audio processor 240 converts voice/sound data into an audible sound and outputs the audible sound through the speaker 241 under the control of the controller 270. The audio processor 240 may convert an audio signal such as a voice from the microphone 243 into a digital signal, and transfers the display signal to the controller 270.

The speaker 241 may output audio data received from the RF communication unit 210 or stored in the memory 250 in a call mode, a record mode, a voice recognition mode, a broadcasting receiving mode, etc. The speaker 241 may output a sound signal associated with a function (e.g., received call signal sound, received message sound, music file playback). More particularly, the speaker 241 may output a sound signal associated with guide information (e.g., road guide information) according to a change in the location information upon operation of the LBS.

The microphone 243 receives and processes an external sound signal to electric voice data in a call mode, a record mode, a voice recognition mode, etc. The processed voice data are converted into a transmissible format and the converted data are outputted to a mobile communication base station through a mobile communication module 211. Various noise removal algorithms for removing a noise generated during a procedure of receiving an external sound signal may be implemented in the microphone 243.

The memory 250 may store a program for processing and control of the controller 270, and may temporarily store input/output data (e.g., a telephone directory, a message, an audio, a still image, an electronic book, a moving image, etc.). The memory 250 may store a use frequency (e.g., frequencies of the use of applications, a phone number, a message, multi-media data, etc.), importance information, preference information, etc. according to function operation of the mobile device 200. The memory 250 may store data regarding vibration and sound of various patterns output upon a touch input on the touch screen. More particularly, the memory 250 may store a DB of auxiliary data received from the server 300, weight adjustment information (satellite information and density information), and satellite information determined with reference to the auxiliary data and the weight adjustment information in a mapping table. The memory 250 may store a threshold value (e.g., Th1) defining the number of satellites ensuring line of sight having the smallest size necessary to determine a location and a reach threshold value (e.g. Th2) defining a reference moving distance to a support radius of a server connected by the mobile device 200.

The memory 250 may include a storage medium having at least one type of a flash memory type, a hard disk type, a multimedia card micro type, a card type of a memory (for example, an SD or XD memory), Random Access Memory (RAM), Static Random Access Memory (SRAM), Read-Only Memory (ROM), Electrically Erasable Programmable Read-Only Memory (EEPROM), Programmable Read-Only Memory (PROM), Magnetic RAM (MRAM), a magnetic disc, and an optical disc. The mobile device 200 may operate associated with a web storage executing a storage function of the memory 250 on Internet.

The interface unit 260 performs a function of interfacing all external devices connected to the mobile device 200 with each other. The interface unit 260 may receive data or power from an external device, transfer the data or power to each element of the inside of the mobile device 200, or transmit data of mobile device 200 to an external device. For example, the interface unit 260 may include a wire/wireless headset port, an external charger port, a wire/wireless data port, a memory card port, a port of connecting a device having an identity module, an audio I/O (input/output) port, a video I/O (input/output) port and an earphone port.

The controller 270 controls an overall operation of the mobile device 200. For example, the controller 270 may perform control and processing associated with a voice call, data communication, a video call, etc. The controller 270 may include a multi-media module (not shown) for playing multi-media. The multi-media module may be implemented in or separately from the controller 270.

More particularly, in operation of LBS, the controller 270 may control an overall operation associated with an operation of determining location information in which position accuracy of the mobile device 200 is improved. Upon operation of the LBS, the controller 270 controls a series of operation for improving position accuracy of the mobile device using a DB of the auxiliary data. For example, upon performing the LBS, the controller 270 may identify a satellite signal received through a multi-path in a current location of the mobile device 200 among satellite signals using the auxiliary data. Further, the controller 270 suitably filters the identified multi-path satellite signal to correct a location error through the multi-path.

According to exemplary embodiments of the present invention, the controller 270 controls an operation of acquiring auxiliary data corresponding to initial location information of the mobile device 200 from the server 300. Upon acquiring the auxiliary data corresponding to the initial location information from the server, the controller 270 may identify a satellite to be used to determine a location with reference to the auxiliary data. Further, the controller 270 controls determination of the location according to a satellite signal of a satellite having a high weight through identification of the satellite. In this case, the controller 270 may generate weight adjustment information with reference to the auxiliary data, adjust weights by satellites using the weight adjustment information, and determine a preference of the satellite according to a weight by satellites. A more detailed control operation of the controller 270 will be described in an example of an operation of the mobile device 200 and a control method thereof referring to following drawings.

The power supply 280 uses power which is applied from an external power source or an internal power source thereto and supplies power necessary to operate each constituent element to each constituent element, under control of the control unit 270.

Various exemplary embodiments of the present invention may be implemented in a recording medium which may be read by a computer or a similar device using software, hardware or a combination thereof. According to hardware implementation, various exemplary embodiments of the present invention may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and an electric unit for executing the functions. In some cases, variation exemplary embodiments may be implemented by the controller 270. According to the software implementation, exemplary embodiments of procedures and functions according to the specification may be implemented by separate software modules. The software modules may perform at least one function and operation described in the specification.

The recoding medium may include a computer readable recording medium recording a program which acquires auxiliary data corresponding to initial location information of a mobile device 200 upon execution of an LBS from server 300, differentially applies weights to a sight line ensuring satellite and a sight line non-ensuring satellite with reference to the auxiliary data, determines a satellite to be used to determine a location according to the weights applied to the sight line ensuring satellite and the sight line non-ensuring satellite to process the determination of the location.

Further, the mobile device 200 shown in FIG. 2 may include various devices using an Application Processor (AP), a Graphic Processing Unit (GPU), and/or a Central Processing Unit (CPU) such as various information communication devices, multi-media devices, and application devices thereof supporting a function of the present invention. For example, the mobile device 200 includes devices such as a tablet Personal Computer (PC), a Smart Phone, a digital camera, a Portable Multimedia Player (PMP), a media player, a portable game terminal, a laptop computer, a Personal Digital Assistant (PDA), as well as mobile communication terminals operating based on respective communication protocols corresponding to various communication systems.

Figure 3:
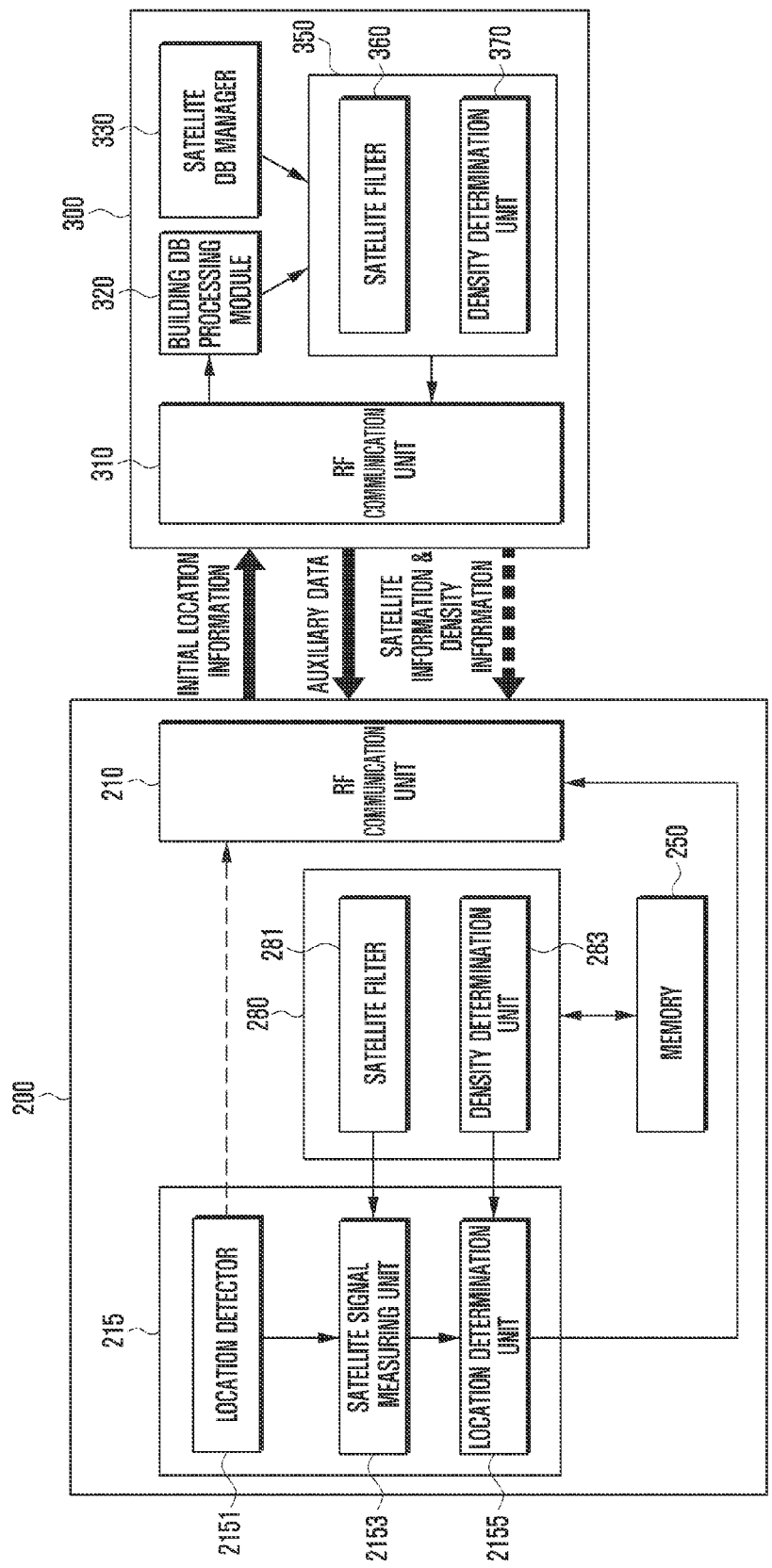
FIG. 3 is a block diagram illustrating operations of constituent elements of a mobile device and a server according to an exemplary embodiment of the present invention.

FIG. 3 is a block diagram illustrating operations of constituent elements of a mobile device and a server according to an exemplary embodiment of the present invention.

Although it will be illustrated in FIG. 3 that both the mobile device 200 and the server 300 include weight determination modules 280 and 350, the weight determination modules 280 and 350 may be selectively implemented in one of the mobile device 200 and the server 300 according to an exemplary operation scheme of the present invention.

For example, as will be described later, in a case of a scheme where the mobile device 200 receives only auxiliary data from the server 300, a weight determination module 280 of the mobile device 200 may be used. As will be described below, in a case where the server 300 provides information (e.g., weight adjustment information) necessary to determine a location of the mobile device 200 using auxiliary data, a weight determination module 350 of the server 300 may be used.

Referring to FIG. 3, the mobile device 200 includes a location determination module 215, a weight determination module 280, a memory 250, and an RF communication 210 (e.g., a WLAN module). The location determination module 215 includes a location detector 2151, a satellite signal measuring unit 2153, and a location determination unit 2155. The location detector 2151 detects a location of the mobile device 200. More particularly, the location detector 2151 acquires current location information (hereinafter referred to as 'initial location information') of the mobile device under control of the controller 270. The location detector 2151 may acquire the initial location information from at least one of a location value (wireless positioning technology in a network based scheme) acquired using a base station signal, a location value (e.g., Wi-Fi Positioning Service (WPS) technology) acquired using a wireless Access Point (AP) received through Wi-Fi, a location value acquired from a fixed GNSS. etc. Moreover, the location detector 2151 may transfer the acquired initial location information to the RF communication unit 210 under control of the controller 270.

The weight determination module 280 of the mobile device 200 generates weight adjustment information using the auxiliary data of the server 300 received through the RF communication unit 210. The weight determination module 280 includes a satellite filter 281 and a density determination unit 283. The weight determination module 280 may be implemented inside the controller 270, or may be implemented separately from the controller 270.

The satellite filter 281 filters satellite information using the auxiliary data of the server 300 received through the RF communication unit 210. For example, the satellite filter 280 performs filtering to classify a satellite (sight line ensuring satellite) having an ensured line of sight and a satellite (sight line non-ensuring satellite) transferring a signal through a multi-path in which a line of sight is not ensured. In this case, the satellite filter 281 may classify the sight line ensuring satellite from the sight line non-ensuring satellite in consideration of building information such as a location, an area, a height, light reflectivity of buildings, locations of satellites, etc. In an exemplary implementation, the satellite filter 281 matches vector information (e.g., information such as directionality or distance) between satellites, and auxiliary data to a current location (that is, location of initial location information) of the mobile device 200 estimated as a current location to classify weights of the sight line ensuring satellite and the sight line non-ensuring satellite in a current location of the mobile device 200. The satellite filter 280 provides satellite information in which the weight is classified to the satellite signal measuring unit 2153.

The density determination unit 283 determines a density for peripheral buildings corresponding to the initial location information using the auxiliary data of the server 300 received through the RF communication unit 210. For example, the density determination unit 283 may determine dense degrees of buildings of peripheral topography objects based on a current location (that is, location of initial location information) of the mobile device 200 using a location, an area, a height, light reflectivity of buildings, etc. according to the auxiliary data to generate corresponding density information. Here, the density may be probabilistically determined by estimating a shielded degree when viewing the sky from a current location of the mobile device 200. For example, when it is estimated that a whole sky is omni-directionally viewed, the density is low. In contrast, in the middle of a city, when it is estimated that the sky is restrictively viewed, the density is high so that a probability value (%) is represented. The density determination unit 283 provides density information to the location determination unit 2155.

The satellite signal measuring unit 2153 measures a satellite signal using initial location information acquired by the location detector 2151 and satellite information provided from the satellite filter 281. That is, when measuring a satellite signal from the current location (that is, initial location information), the satellite signal measuring unit 2153 applies a weight to a satellite signal of a sight line ensuring satellite with reference to satellite information according to the weight to measure a satellite signal. The satellite signal measuring unit 2153 transfers measuring information according to measurement of the satellite signal to the location determination unit 2155.

The location determination unit 2155 determines a current location of the mobile device 200 with reference to measuring information of the satellite signal measuring unit 2153 and density information of the density determination unit 283. The location determination unit 2155 determines which satellite of satellites transferring a satellite signal is preferentially trusted with reference to satellite signal measuring information based on the satellite information and the density information. The location determination unit 2155 preferentially uses a satellite signal of a satellite having high reliability (that is, a satellite to which a high weight is applied) to determine a location. The location determination unit 2155 excludes a satellite signal of low reliability (that is, a satellite to which a low weight is applied) to determine a location or reduces a preference of the satellite signal of low reliability (that is, apply a low weight) to determine the location. For example, when the number of sight line ensuring satellites is sufficient to determine the location (e.g., at least 4 or greater), a satellite signal of a satellite having a high multi-path (that is, sight line non-ensuring satellite) may be excluded when determining the location. When the number of sight line ensuring satellites is not sufficient (e.g., less than 4), a low weight is applied to a satellite signal of a satellite having a high multi-path (that is, a sight line non-ensuring satellite) to determine the location, or an error range is determined and compensated and the compensated error range is applicable to determination of the location. Various positioning filters may be used to determine the location in the present invention. For example, a Kalman Filter, a Least Mean Squares (LMS) filter, a Recursive Least Squares (RLS) filter, etc. may be used.

The memory 250 may store a DB of the auxiliary data from the server 300 in a current location of the mobile device 200, the weight adjustment information (satellite information and density information), and the determined location information in the form of a mapping table.

Meanwhile, the server 300 includes an RF communication unit 310 (particularly, WLAN module), a building DB processing module 320, a satellite DB manager 330, and a weight determination module 350 having a satellite filter 360 and a density determination unit 370. The server 300 may further include a DB for storing auxiliary data and satellite information on buildings. The DB is associated with a building DB processing module 320 and a satellite DB manager 330, and may be implemented inside the server 300 or may be implemented as a separate configuration.

The building DB processing module 320 manages auxiliary data on peripheral buildings of the server 300. The building DB processing module 320 may record and manage auxiliary data on buildings within a preset distance in the server 300. When initial location information of the mobile device 200 is transferred through the RF communication unit 310, the building DB processing module 320 extracts auxiliary data corresponding to the initial location information. That is, the building DB processing module 320 may extract auxiliary data of peripheral buildings located within a preset radius (e.g., 50 m, 100 m, 500 m, etc.) based on a current location of the mobile device 200, that is, an initial location of the mobile device 200. The building DB processing module 320 may transfer the extracted auxiliary data to the mobile device 200 through the RF communication unit 310. According to exemplary embodiments of the present invention, when a weight determination module 350 is configured in the server 300, the building DB processing module 320 may transfer the auxiliary data to the weight determination module 350.

The satellite DB manager 330 manages satellite information of a satellite according to an Assisted Global Positioning System (AGPS) or satellite information of a satellite according to satellite orbit information (e.g., Almanac or Ephemeris). The satellite DB manager 330 may transfer the satellite information of the satellite to the mobile device 200 through the RF communication unit 310. According to exemplary embodiments of the present invention, when the weight determination module 350 is configured in the server 300, the satellite DB manager 330 may transfer satellite information by satellites to the weight determination module 350.

The weight determination module 350 may be selectively implemented according to an operation scheme of the present invention. In this case, the configuration of the weight determination module 280 implemented in the mobile device 200 may be omitted. The weight determination module 350 of the server 300 may perform a function corresponding to the weight determination module 280 of the mobile device 200. The weight determination module 350 includes the satellite filter 360 and the density determination unit 370. Further, the weight determination module 350 may generate satellite information and density information corresponding to processing as illustrated above with reference to the weight determination module 280 of the mobile device 200. The weight determination module 350 may transfer the generated satellite information and density information to the mobile device 200 through the RF communication unit 310. In this case, the weight determination module 350 may simultaneously transfer location information (e.g., location information of a satellite according to AGPS or satellite orbit information (e.g., Almanac or Ephemeris)) with respect to a satellite corresponding to the initial location information as necessary.

Figure 4:
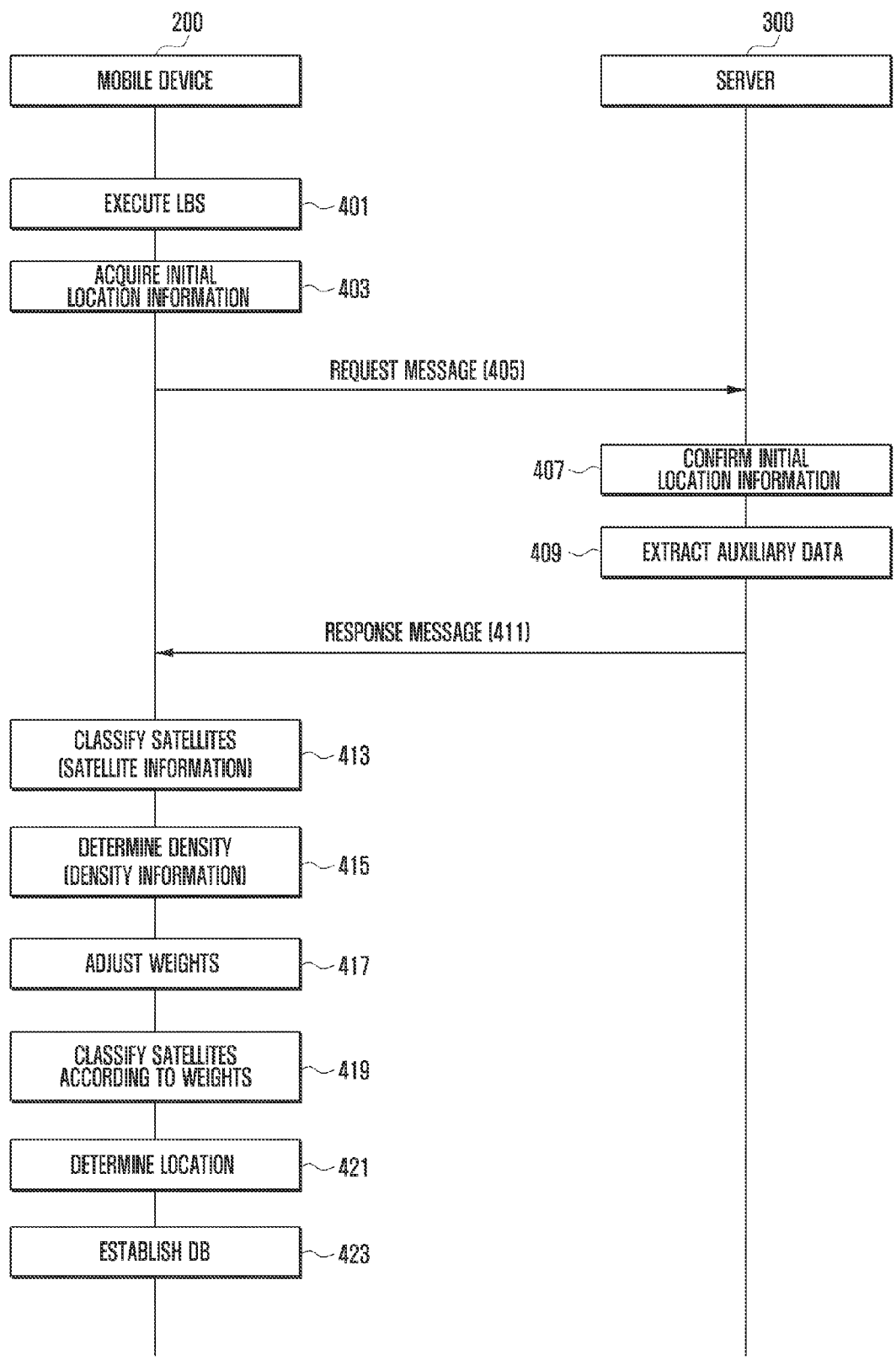
FIG. 4 is a sequence diagram illustrating a method of providing a location service by a mobile device and a server according to an exemplary embodiment of the present invention.

FIG. 4 is a sequence diagram illustrating a method of providing a location service by the mobile device 200 and the server 300 according to an exemplary embodiment of the present invention.

Referring to FIG. 4, if execution of LBS is detected in step 401, a mobile device 200 acquires current location information (hereinafter referred to as 'initial location information') in step 403. For example, if execution of the LBS such as positioning or navigation input from a user is generated, the mobile device 200 acquires the initial location information with respect to a current location of the mobile device while executing a corresponding function. In this case, the mobile device 200 may use the initial location information from at least one of a location value (wireless positioning technology in a network based scheme) acquired using a base station signal, a location value (Wi-Fi Positioning Service (WPS) technology) acquired using wireless Access Point (AP) received through Wi-Fi, a location value acquired from a fixed GNSS, etc. as the initial location information.

Upon acquisition of the initial location information, the mobile device 200 requests auxiliary data from a server 300 included in a peripheral building in step 405. The mobile device 200 may connect with the server 300 operating as an AP through the WLAN module 213, and may transmit a request message requesting to provide a DB of auxiliary data to the connected server 300. The request message may include initial location information acquired by the mobile device 200.

The auxiliary data represents information on peripheral buildings corresponding to initial location information requested from the mobile device 200, and may include information on a location, an area, a height, and light reflectivity of the buildings, three-dimensional (3D) building information, and information on peripheral topography objects.

When the request message is received from the mobile device 200, the server 300 confirms initial location information of the mobile device 200 in step 407. That is, the server 300 may parse the received request message to acquire initial location information, and may estimate a current location of the mobile device 200 from the initial location information.

The server 300 extracts auxiliary data of peripheral buildings corresponding to the initial location information of the mobile device 200 in step 409. For example, the server 300 may scan and extract auxiliary data with respect to peripheral buildings corresponding to a current location of the mobile device 200 from a DB of the server 300. That is, the server 300 extracts auxiliary data with respect to buildings managed within a preset support radius. In this case, the server 300 may extract auxiliary data of peripheral buildings located within a preset radius (e.g., 50 m, 100 m, 500 m) based on a current location of the mobile device 200, that is, an initial location of the mobile device 200. The server 300 may simultaneously acquire satellite information of a satellite according to AGPS upon extraction of the auxiliary data or location information of a satellite according to satellite orbit information (e.g., Almanac or Ephemeris) when the AGPS is impossible.

The server 200 transmits the extracted auxiliary data to the mobile device 200 in step 411. For example, the server 200 may extract auxiliary data corresponding to the request message, and may transmit a response message with the extracted auxiliary data to the mobile device 200. In this case, the server 200 may transmit the response message with the satellite location information. That is, the response message may further include satellite information with respect to satellites with which the mobile device 200 may communicate as well as auxiliary data. In this case, the satellite information may be not fixed but may be adaptively changed according to a motion orbit of the satellite.

If the response message is received from the server 300, the mobile device 200 generates satellite information according to a sight line ensuring satellite and a sight line non-ensuring satellite in step 413. For example, the mobile device 200 may parse a received response message to acquire auxiliary data, and may classify a sight line ensuring satellite in which a line of sight is ensured and a sight line non-ensuring satellite transferring a signal through a multi-path in which the line of sight is not ensured. When receiving the auxiliary data from the server 300, the mobile device 200 maps vector information (e.g., directionality or distance) between satellites and auxiliary data to a current location of the mobile device 200 to classify a sight line ensuring satellite from a sight line non-ensuring satellite in a current location, and may generate satellite information obtained by mapping the result to each satellite. The sight line ensuring satellite and the sight light non-ensuring satellite may be classified using satellite location information acquired from the server 200. For example, the satellites may be classified by comparing the received satellite location information, the auxiliary data, and current location information of the mobile device 200 with each other.

If the response message is received from the server 300, the mobile device 200 determines a density of peripheral buildings from the auxiliary data of the response message to generate density information in step 415. For example, the mobile device 200 may determine a dense degree of buildings of peripheral topography objects based on a current location (that is, location of initial location information) using a location, an area, a height, and light reflectivity of the buildings according to the auxiliary data, and generate corresponding density information.

The mobile device 200 adjusts weights by satellites using the satellite information and the density information in step 417. That is, the mobile device 200 may adjust weights for determining which satellite of satellites transferring a satellite signal is preferentially trusted with reference to satellite signal measuring information based on the satellite information and the density information. The present invention may adjust weights for determining a satellite to be trusted using various positioning filters which is used to determine the location. For example, a Kalman Filter, an LMS filter, an RLS filter, etc. may be used as the positioning filter. Further, according to exemplary embodiments of the present invention, upon adjustment of the weight using the positioning filter, a low weight is applied to a satellite signal received through a multi-path using the satellite information and the density information so that position accuracy may be improved. That is, a satellite signal of a satellite to which a high weight is applied is preferentially used to determine a location. A satellite signal of a satellite to which a low weight is applied is excluded to determine the location, an error range is determined and compensated, a preference is reduced (that is, apply a low weight) and is applicable to determination of the location.

For example, when the number of sight line ensuring satellites is sufficient to determine the location (e.g., at least 4 or greater), a satellite signal of a satellite having a high multi-path (that is, sight line non-ensuring satellite) may be excluded to determine the location. When the number of sight line ensuring satellites is not sufficient (e.g., less than 4), a low weight is applied to a satellite signal of a satellite having a high multi-path (that is, sight line non-ensuring satellite) to determine the location, or an error range is determined and compensated and the compensated error range is applicable to determination of the location.

Further, when using density information of buildings in a current location of the mobile device 200, a greater weight is applied to a location source other than a satellite necessary to determine the location to be used for determining the location. For example, the other location source may include a location using an inertial sensor, a location using a Dead Reckoning (DR) scheme, and a dynamic model estimation value in a Kalman Filter. The scheme using the inertial sensor represents a scheme of obtaining a location using various navigation relation information such as acceleration, speed, a direction, and a distance of the mobile device 200. The DR scheme represents a scheme of obtaining a location and a direction of the mobile device 200 using a gyro, an encoder, and a speedometer. A scheme using the dynamic model estimation value in a Kalman Filter represents a scheme of compensating a probability error included in a measuring value such as a location, speed, or acceleration of the mobile device 200 to estimate the location of the mobile device 200.

As described above, the mobile device 200 adjusts weights by satellites using the satellite information and the density information, and classifies the satellites in step 419, and determines the location based on satellites having a high weight in step 421. The mobile device 200 may determine which satellite of satellites transferring a satellite signal is preferentially trusted according to the weights by satellites adjusted with reference to satellite signal measuring information based on the satellite information and the density information. The mobile device 200 may determine a current location based on satellites of a preference.

When the determination of the location is terminated according to the foregoing procedure, the mobile device 200 establishes a DB using relation information use to determine the location in step 423. For example, the mobile device may store a DB of the auxiliary data from the server 300 in a current location, satellite information and density information determined based on the auxiliary data, and data such as location information determined based on the auxiliary data, the satellite information and the density information. Accordingly, in subsequent events, the mobile device 200 may rapidly determine the location with reference to the data in the DB without additionally connecting with the server 300 in a current location, and accordingly may improve position accuracy in real time.

As illustrated above, according to exemplary embodiments of the present invention, the mobile device 200 may receive auxiliary data from a peripheral server 300 in a current location, classify a sight line ensuring satellite and a sight line non-ensuring satellite using the received auxiliary data, and determine a location corresponding to weights by the classified satellites. Accordingly, the mobile device 200 may continuously improve position accuracy without additional connection with the server 300 for a predetermined time (within a predetermined radius) using a current location estimation value and auxiliary data.

Further, according to exemplary embodiments of the present invention, the auxiliary data may be provided upon manufacture of the mobile device 200 or may be provide through an external server (e.g., business server or contents server). For example, the user connects with the business server or the contents server using the mobile device 200 to download the auxiliary data and previously store the auxiliary data in the memory 250. In this case, the auxiliary data may be downloaded once for all zones or may be downloaded according to countries, cities, or zones (e.g., towns or specifically designated zones). Accordingly, the mobile device 200 may improve position accuracy using previously stored auxiliary data without association with the server 300. For example, the mobile device may extract auxiliary data corresponding to the acquired initial location information from the previously stored auxiliary data when the initial location information is acquired, and may determine the location as described above using the extracted auxiliary data.

Although not shown and illustrated, location determination of the mobile device 200 as illustrated above may process location information (that is, satellite information and peripheral density information) based on a multi-path satellite signal by the server 300 at steps 413 and 415 and transfer the processed location information to the mobile device 200. Then, the mobile device may determine the location based on received information, so that a determination amount according to location determination in the mobile device 200 can be reduced. Further, according to exemplary embodiments of the present invention, the server 200 may perform steps 413 to 421. That is, the server 300 may determine the location of the mobile device 200 corresponding to the foregoing operation, and may transmit the result to the mobile device 200. Accordingly, the mobile device 200 may receive position information with respect to a current location without a separate location determination procedure.

Figure 5:
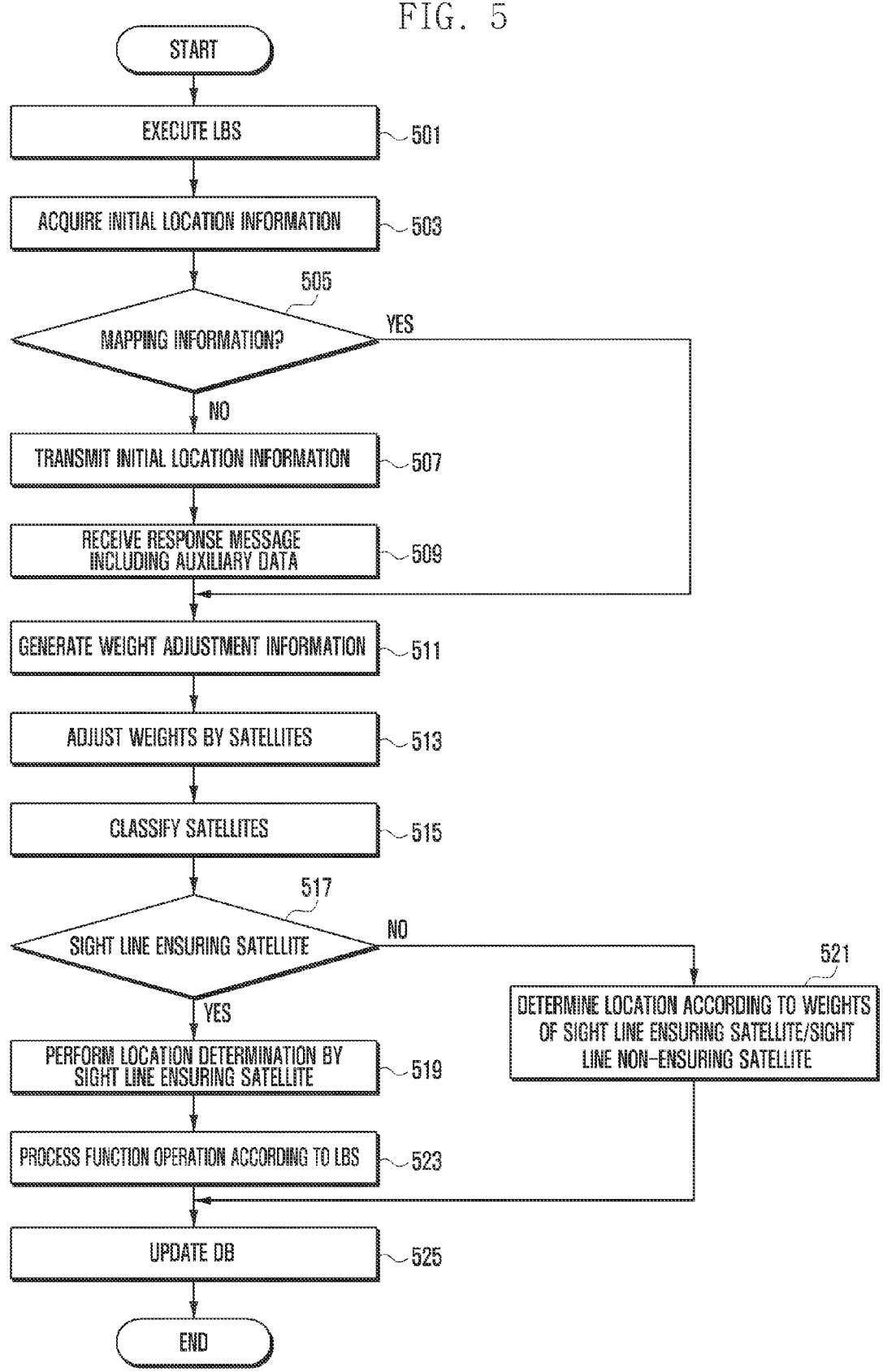
FIG. 5 is a flowchart illustrating a method of providing location information in a mobile device according to an exemplary embodiment of the present invention.

FIG. 5 is a flowchart illustrating a method of providing location information in a mobile device according to an exemplary embodiment of the present invention.

Referring to FIG. 5, if execution of an LBS is detected in step 501, a controller 270 of a mobile device 200 acquires current location information (hereinafter referred to as 'initial location information') in step 503. For example, the controller 270 may acquire initial location information using a signal acquired through a base station, a WPS, a fixed GNSS, etc.

The controller 270 determines whether there is mapping information corresponding to the acquired initial location information in step 505. For example, the controller 270 may determine whether there is mapping information (auxiliary data or weight adjustment information) matching with the acquired initial location information in the mapping table stored in the memory 250.

If there is the mapping information corresponding to the initial location information (YES of step 505), the controller 270 proceeds to step 511 to generate weight adjustment information using the auxiliary data and performs following procedures. When the mapping information corresponding to the initial location information is the weight adjustment information, the controller 270 may directly perform step 513.

When there is no mapping information corresponding to the initial location information (NO of step 505), the controller 270 transmits the acquired initial location information to the server 300 in step 507. That is, the controller 270 may control connection with a server 300 operating as an AP through a WLAN module 213, and transmit a request message requesting to provide auxiliary data corresponding to the initial location information to the connected server 300. The server 300 operating as the AP may be selected through AP scan in a current location of the mobile device 200, and may determine a server having the highest Received Signal Strength Indication (RSSI) among servers located at a periphery as the server 300 operating as the AP. When receiving the initial location information of the mobile device 200, the server 300 may extract auxiliary data corresponding to the received initial location information and may transmit a response message including the extracted auxiliary data to the mobile device 200.

The controller 270 receives a response message including the auxiliary data from the server 300 as a response to the request message in step 509. When the response message is not received after transmitting the request message to the server 300, the controller 270 may retransmit the request message or perform preset operations such as transmission of a request message by scan and connection of a new server.

When receiving the response message from the server 300, the controller 270 parses the response message to acquire auxiliary data, and generates weight adjustment information (that is, satellite information and density information) with reference to the acquired auxiliary data in step 511. For example, as illustrated above, the controller 270 may generate satellite information according to a sight line ensuring satellite in which a line of sight is ensured and a sight line non-ensuring satellite transferring a signal through a multi-path in which the line of sight is not ensured based on the auxiliary data. Moreover, the controller 270 may determine a density of peripheral buildings from the auxiliary data to generate density information.

The controller 270 adjusts weights by satellites using the weight adjustment information in step 513. That is, the controller 270 may allocate a higher weight to a satellite signal of a sight line ensuring satellite and allocate a lower weight to a satellite signal of a sight line non-ensuring satellite received through a multi-path with reference to satellite information and density information according to the weight adjustment information.

The controller 270 adjusts a weight using weight adjustment information and classifies satellites in step 515. That is, the controller 270 may determine which satellite is preferentially trusted according to weights of the satellites transferring a satellite signal.

The controller 270 classifies the satellites according to the weights and determines whether a sight line ensuring satellite satisfies a minimum threshold Th1 (e.g., Th1=4) necessary to determine the location in step 517. That is, the GNSS receives a signal from a satellite to measure a pseudo-range between the satellite and the mobile device 200. Typically, the controller 270 positions a location of the mobile device by the triangulation principle using the pseudo-range and location information of a satellite measured from at least four satellites. The following description will be made on the assumption that the minimum threshold Th1 necessary to determine the location is four. Of course, this is merely for sake of explanation and not to be considered limiting as the minimum threshold may be less than or greater than four.

If the sight line ensuring satellite satisfies the minimum threshold Th1 (YES of step 517), the controller 270 performs location determination by the sight line ensuring satellite in step 519. When the number of sight line ensuring satellites is sufficient to determine the location (e.g., at least 4 or greater), a satellite signal of a sight line non-ensuring satellite may be excluded to determine the location and a current location of the mobile device 200 may be positioned using a satellite signal of sight line ensuring satellites having a high preference (that is, to which a high weight is allocated).

If the sight line ensuring satellite does not satisfy the minimum threshold Th1 (NO of step 517), the controller 270 determines the location according to weights of the sight line ensuring satellite and the sight line non-ensuring satellite in step 521. That is, when the number of sight line ensuring satellites is not sufficient (e.g., less than 4), the controller 270 may reduce dependency with respect to a satellite signal of a sight line non-ensuring satellite having a low weight, and position a current location of the mobile device 200 based on a satellite signal of a sight line ensuring satellite having a high weight.

If location determination of the mobile device 200 is terminated, the controller 270 processes a function operation according to the LBS based on the determined location in step 523. For example, the controller 270 may control such that location information with respect to a current location is displayed on a picture according to a location positing function or a navigation function.

The controller 270 may update an internal DB using location information determined again with the initial location information in step 525. That is, when location determination is terminated according to the foregoing procedure, the controller 270 may update the DB using relation information used to determine the location. For example, the mobile device 200 may make a DB of initial location information in a current location, auxiliary data received from the server 300, weight adjustment information determined based on the auxiliary data, and data such as location information determined with reference to the auxiliary data and the weight adjustment information to update a mapping table. Accordingly, the mobile device 200 may rapidly determine the location with reference to the data in the DB without additionally connecting with the server 300 in a current location after this, and accordingly may improve position accuracy in real time.

Meanwhile, although not shown in FIG. 5, the controller 270 may periodically control execution of the foregoing location positioning operation. For example, the controller 270 acquires initial location information according to a preset time period. When current initial location information is different from previous initial location information, the controller 270 may connect with the server 300 to update location information with respect to the LBS through location positioning through the foregoing procedure. The controller 270 determines a moving distance of the mobile device 200. When the moving distance is equal to or greater than a preset distance based on the initial location information, the controller 270 may connect with the server 300 in a moved location to update location information with respect to the LBS through location positioning through the foregoing procedure.

Figure 6:
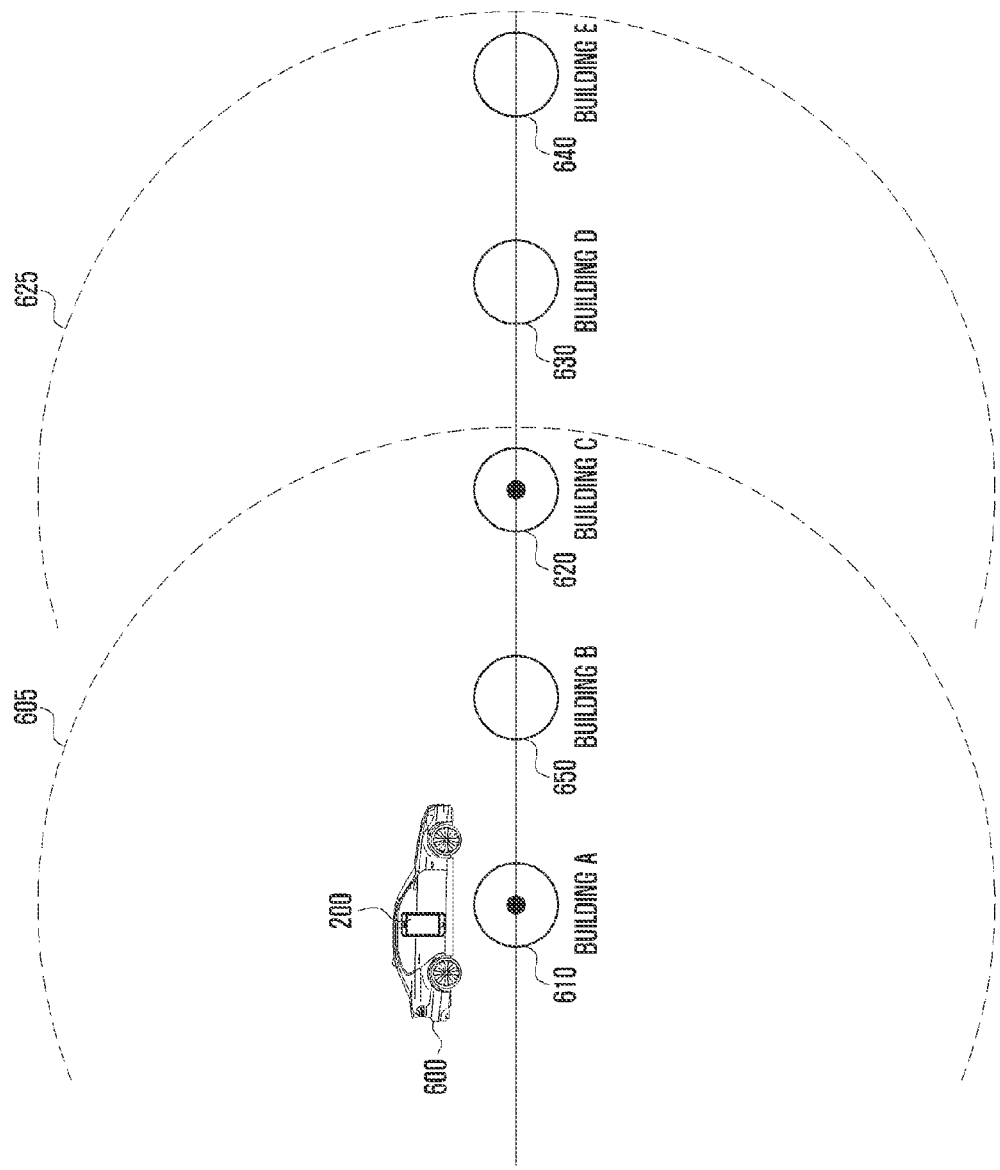
FIG. 6 is a diagram illustrating a location information update operation in consideration of movement of a mobile device according to an exemplary embodiment of the present invention.

FIG. 6 is a diagram illustrating a location information update operation in consideration of movement of a mobile device according to an exemplary embodiment of the present invention.

As shown in FIG. 6, FIG. 6 illustrates an operation of updating location information corresponding to moving speed and direction of a vehicle by the mobile device 200 when the vehicle 600 runs in a state that the mobile device 200 is mounted in the vehicle 600. FIG. 6 illustrates a state in which location information in a current location is acquired based on initial location information of the mobile device 200 in a location of a building A 610, auxiliary data by a server of the building A 610, and weight adjustment information through the foregoing procedure.

Referring to FIG. 6, the vehicle 600 in which the mobile device 200 is mounted may move from the location of the building A 610 to a direction of a building C 620 at predetermined speed. Further, it is assumed that a server of the building A 610 uses a location of the building A 610 as a starting point and has auxiliary data covering a radius 605 of a semi-circle, that is, a building C 620. Further, it is assumed that a server of the building C 620 located in a moving direction of the vehicle 600 uses a location of the building C 620 as a starting point and has auxiliary data covering a radius 625 of a semi-circle, that is, a building D 630 and a building E 640.

In the above state, the mobile device 200 may measure a moving direction, moving speed, and a moving distance according to movement of the vehicle 600. The measurement may be achieved by positioning using an inertial sensor, positioning using the DR scheme, positioning using the Kalman Filter, etc.

Meanwhile, the mobile device 200 may confirm movement change during an operation of a function according to an executed LBS in the building A 610. For example, as illustrated above, a vehicle 600 having the mobile device 200 may move from the building A 610 to the building B 620. Then, if the movement change is confirmed, the mobile device 200 determines whether a server connecting with a currently moved location, that is, a server of the building A 610 has a moving distance greater than a reach threshold Th2 to a predetermined radius 605.

The server (e.g., server of building A 610) may have auxiliary data with respect to peripheral buildings (building B 650, building C 620) within a predetermined radius (e.g., 605) based on a location of the server. Accordingly, when the mobile device 200 is separated from a support radius of a server of the building A 610 in a state that the mobile device 200 connects with the server of the building A 610, the mobile device 200 receives auxiliary data from a new server to perform location positioning so that position accuracy is improved. In this case, the mobile device 200 scans and connects another server when the mobile device 200 is separated from a radius 605 supported from the building A 610. When receiving auxiliary data from another server, the time point may be a time point where the mobile device 200 is separated from a corresponding zone. A blank for location positioning may occur to location positioning by connection with a new server in a state that the mobile device 200 is separated from a support radius of a previously connected server.

Accordingly, in exemplary embodiments of the present invention, the reach threshold Th2 may be set to a value less than a support radius of the server. For example, assuming that a support radius 605 of the server of the building A 610 is 100 m, the reach threshold Th2 may be set to 50 m. Accordingly, the mobile device 200 uses an initial location of the building A 610 as a starting point (0 m), probabilistically determines a moving distance from the starting point, and determines whether the moving distance is equal to or greater than 50 m. The support radius may be changed according to a server of buildings. Accordingly, the reach threshold Th2 may be differently implemented. When receiving the auxiliary data from the server, the mobile device 200 may further receive the reach threshold Th2. Although omitted, when considering a support radius and reach threshold Th2, a moving direction of the mobile device 200 may be further considered.

Since heights of buildings in a city may be different from each other, a satellite previously confirmed as a sight line ensuring satellite may be changed to a sight line non-ensuring satellite or the sight line non-ensuring satellite may be changed into sight line ensuring satellite according to movement of the mobile device 200. Accordingly, in exemplary embodiments of the present invention, a support radius and a reach threshold Th2 of each server may be set in consideration of locations and heights of peripheral buildings. Accordingly, auxiliary data of each server may be previously implemented suitably for a corresponding environment.

Meanwhile, when a moving distance is equal to or greater than the reach threshold Th2, the mobile device 200 estimates another server of a building at a location (within a support radius of a currently connected server) separated from the reach threshold Th2, and may previously ensure auxiliary data of a corresponding server. That is, the mobile device 200 may scan new peripheral server according to a moving distance to acquire new auxiliary data from a corresponding server. For example, as shown in FIG. 6, it is assumed that a location of a building C 620 is estimated that an expected moving location of the mobile device 200 is within a support radius 605 of a server of the building A 610.

Accordingly, when the moving distance of the mobile device 200 is equal to or greater than the reach threshold Th2, the mobile device 200 may previously ensure auxiliary data of a server of the building C 620. For example, the mobile device 200 may acquire auxiliary data with buildings (e.g., building D 630, building E 640) within a radius 625 supported from the building C 620. In this manner, the mobile device 200 may previously ensure auxiliary data with respect to the expected moving location to identify a multi-path satellite signal which can be changed in a moving location. Accordingly, position accuracy can be improved regardless of a moving location of the mobile device 200.

Figure 7:
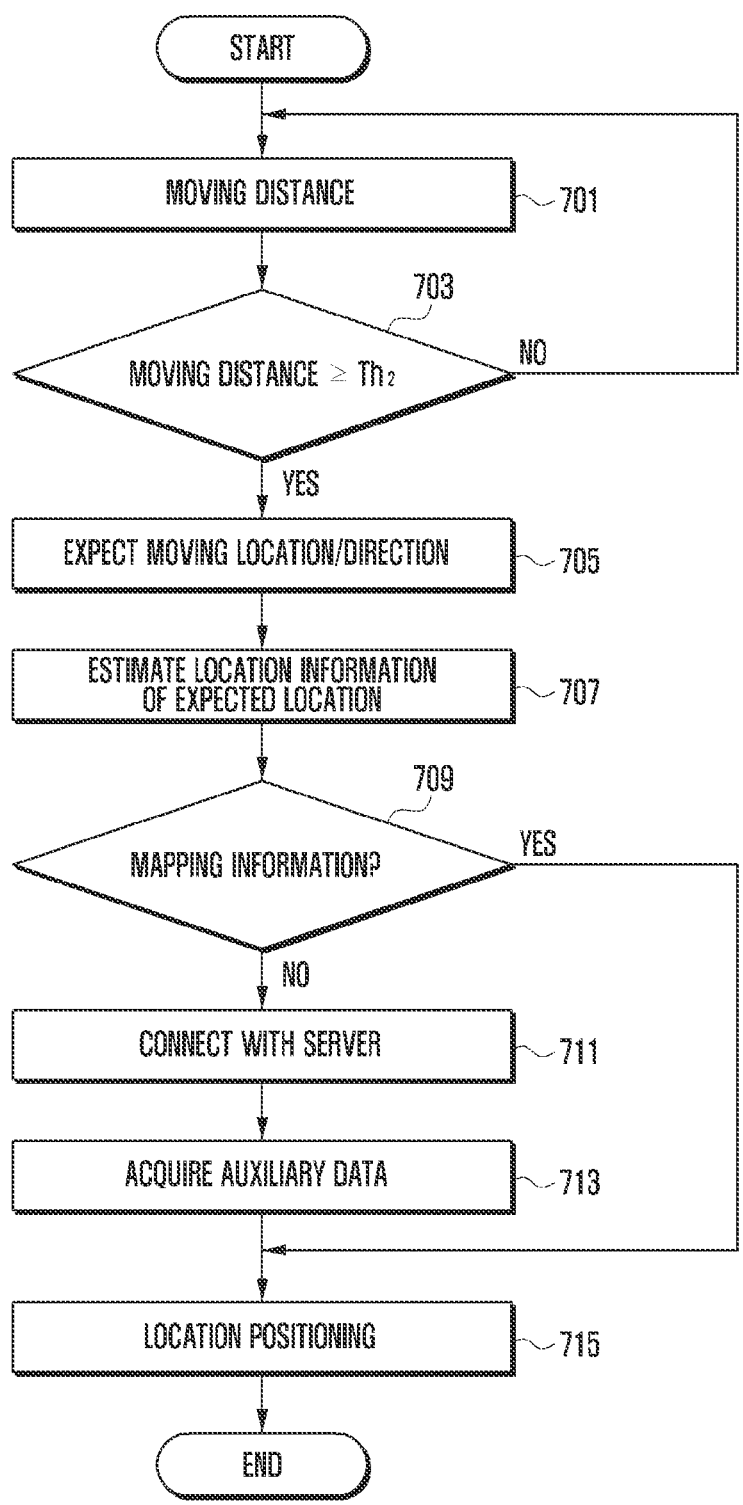
FIG. 7 is a flowchart illustrating a method of providing location information in consideration of movement of a mobile device according to an exemplary embodiment of the present invention.

FIG. 7 is a flowchart illustrating a method of providing location information in consideration of movement in a mobile device according to an exemplary embodiment of the present invention. Particularly, FIG. 7 illustrates an example of an operation of providing location positioning in consideration of movement of the mobile device as illustrated in FIG. 6.

Referring to FIG. 7, a controller 270 of the mobile device 200 determines a moving distance according to movement of the mobile device 200 in step 701, and determines whether the moving distance is equal to or greater than a reach threshold Th2 to a support radius of a currently connected server in step 703. The moving distance represents a moving distance after location positioning using auxiliary data of the server by connecting with the server, and may be periodically checked at a preset time period.

If the moving distance is less than the reach threshold Th2 (NO of step 703), the controller 270 goes to step 701 and performs following operations. If the moving distance is equal to or greater than the reach threshold Th2 (YES of step 703), the controller 270 expects a moving location and direction of the mobile device 200 in step 705. The moving location and direction may be expected by positioning using an inertial sensor, positioning using the DR scheme, positioning using the Kalman Filter, etc. as illustrated above.

If the expected moving location of the mobile device 200 is determined, the controller 270 estimates location information of the expected moving location in step 707. For example, the controller 270 may estimate a location corresponding to a preset distance from a current location to a direction of the expected location. The preset distance may represent a remaining distance between the reach threshold Th2 corresponding to the preset distance and a support radius of the server. The location information of the expected location may estimate location information of an edge location of a support radius of the server with reference to the remaining distance.

When the location information of the expected moving location of the mobile device 200 is estimated, the controller 270 determines whether there is mapping information corresponding to the location information in step 709. For example, the controller 270 may determine whether there is mapping information (auxiliary data or weight adjustment information) matching with the estimated location information in the mapping table stored in the memory 250.

When there is mapping information corresponding to the location information (YES of step 709), the controller 270 performs location positioning using the mapping information in step 715.

When there is not mapping information corresponding to the location information (NO of step 709), the controller 270 connects with a server 300 located around a location of the estimated location information in step 711. For example, assuming that the mobile device moves from a location of a building A 610 to a location of a building C 620 as illustrated in FIG. 6, the controller 270 may estimate a location of the building C 620 and connect with a server of the building C 620 situated at the estimated location.

When connecting with the server 300, the controller 270 acquires auxiliary data of the server 300 from the server 300 in step 713, and performs location positioning according to the foregoing procedure using the acquired auxiliary data in step 715. For example, the controller 270 may allocate weights by satellites using the auxiliary data, and determine the location according to the weights by satellites.

Figure 8:
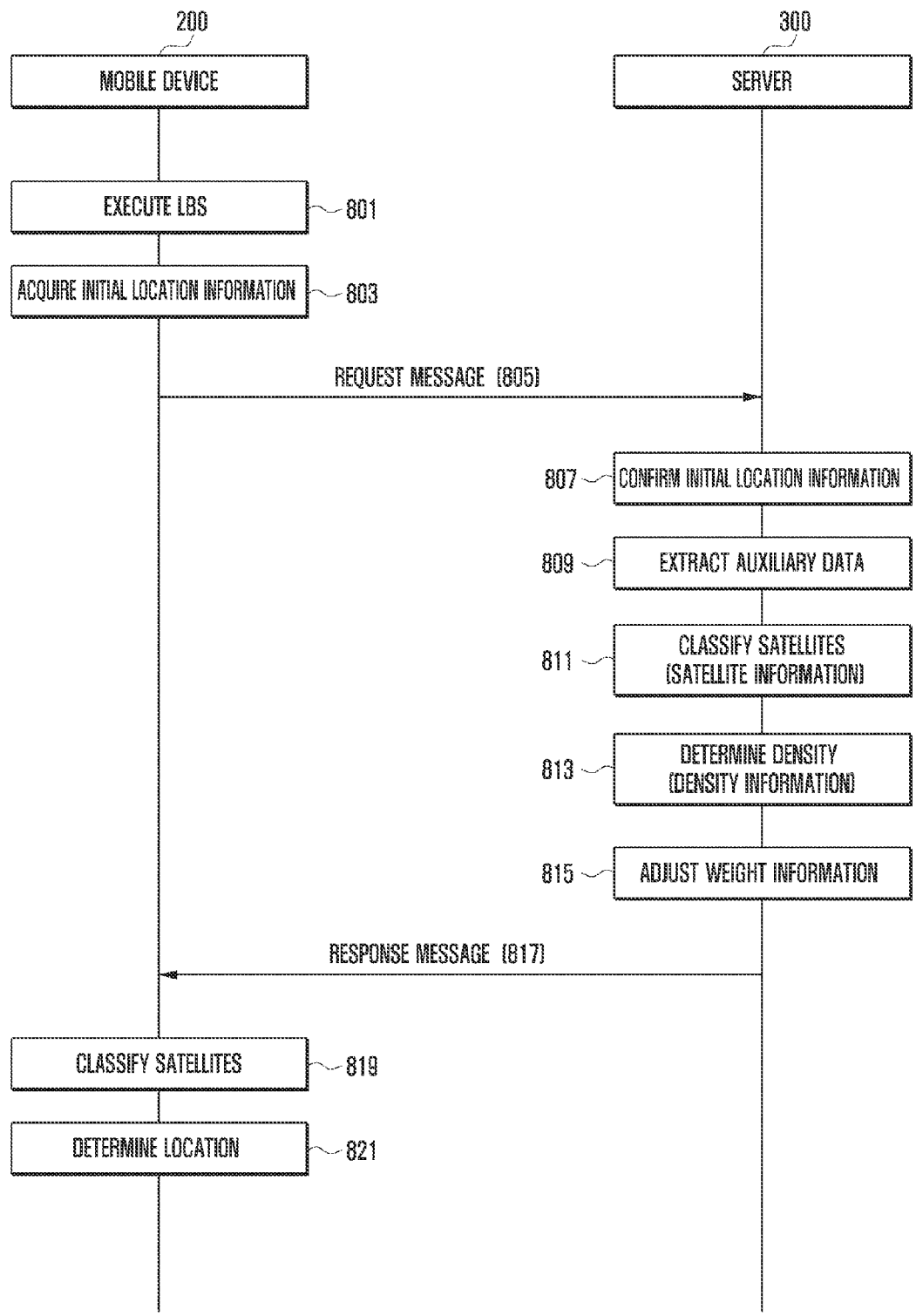
FIG. 8 is a flowchart illustrating a method of providing a location service by a mobile device and a server according to an exemplary embodiment of the present invention.

FIG. 8 is a flowchart illustrating a method of providing a location service by a mobile device and a server according to an exemplary embodiment of the present invention. Particularly, FIG. 8 illustrates an example of an operation of generating and providing weight adjustment information by satellites to the mobile device 200 by the server 300.

Referring to FIG. 8, if execution of the LBS is detected in step 801, a mobile device 200 acquires schematic current location information (hereinafter referred to as 'initial location information') in step 803. For example, the mobile device 200 may acquire initial location information using a signal acquired through a base station, a WPS, a fixed GNSS, etc. as illustrated above.

Upon acquisition of the initial location information, the mobile device 200 transmits a request message requesting auxiliary data (e.g., building information) to a server 300 included in a peripheral building in step 805. The mobile device 200 may connect with the server 300 operating as an AP through the WLAN module 213, and may transmit a request message requesting to provide a DB of auxiliary data to the connected server 300.

When the request message is received from the mobile device 200, the server 300 confirms initial location information of the mobile device 200 in step 807. That is, the server 300 may parse the received request message to acquire initial location information, and may estimate current location of the mobile device 200 from the initial location information.

The server 300 extracts auxiliary data of peripheral buildings corresponding to the initial location information of the mobile device 200 in step 809. For example, the server 300 may search and extract auxiliary data with respect to peripheral buildings corresponding to a current location of the mobile device 200 from a DB of the server 300. That is, the server 300 extracts auxiliary data with respect to buildings managed within a preset support radius.

The server 300 generates satellite information according to a sight line ensuring satellite and a sight line non-ensuring satellite using the extracted auxiliary data in step 811. For example, the server 200 classifies a satellite (sight line ensuring satellite) having ensured line of sight and a satellite (sight line non-ensuring satellite) transferring a signal through a multi-path in which a line of sight is not ensured with reference to the auxiliary data and a satellite DB managed by the server 200. The satellite DB may be periodically updated along motion orbits of satellites. The server 300 may generate satellite information mapping the classified result to satellites capable of receiving the satellite signal in a current location.

The server 300 determines a density of peripheral buildings with reference to the auxiliary data to generate density information in step 813. In this case, the density information may be previously determined and stored by the server 300 without a separate determination procedure.

The server 300 generates weight adjustment information by satellites corresponding to a current location of the mobile device 300 using the satellite information and the density information in step 815. That is, the server 300 may generate weight adjustment information for determining which satellite of satellites transferring a satellite signal from the mobile device 200 is preferentially trusted with reference to the satellite information and the density information. The server 300 transmits a response message including the generated weight adjustment information to the mobile device 200 in step 817.

If the response message is received from the server 300, the mobile device 200 parses the response message to acquire the weight adjustment information, and classifies the satellites according to the weight adjustment information in step 819. That is, the mobile device 200 may determine which satellite of satellites transferring a satellite signal from the mobile device 200 is preferentially trusted with reference to the weight adjustment information.

The mobile device 200 determines the location corresponding to the classified satellites in step 821. For example, the mobile device 200 may determine a current location based on satellites having high reliability among all satellites transferring the satellite signal according to the adjusted weights by satellites with reference to the weight adjustment information.

As described above, according to an exemplary method and the apparatus for providing location information of a mobile device of the present invention, position accuracy of the mobile device can be improved when providing the LBS such as a location positioning function and a navigation function. According to exemplary embodiments of the present invention, the mobile device may classify a multi-path satellite signal reflected and received by peripheral buildings using auxiliary data with respect to peripheral buildings when measuring the satellite signal of a GNSS in a current location.

According to exemplary embodiments of the present invention, the mobile device may acquire auxiliary data from a server configured in peripheral buildings, and identify a satellite signal received through a multi-path using the acquired auxiliary data. That is, the mobile device may identify a signal received through the multi-path among satellite signals using auxiliary data in a current location, and may suitably filter the identified multi-path satellite signal to correct a location error through the multi-path. Accordingly, when the mobile device performs location positioning and navigation in a city, position accuracy of the mobile device can be improved.

Further, according to exemplary embodiments of the present invention, an LBS of the mobile device is provided using auxiliary data provided through servers of fixed locations (peripheral buildings), so that a determination amount, a data amount, corresponding time and cost to provide the location information of the mobile device can be reduced and consumption of a system resource can be reduced.

Moreover, according to exemplary embodiments of the present invention, since a multi-path satellite signal is identified using auxiliary data provided through servers of fixed locations, location information with respect to a motion orbit of a satellite, moving speed (e.g., a case where the mobile device is mounted in a vehicle and is moved) and a direction of the mobile device, and an altitude of the mobile device (e.g., a case where the mobile device is located in a building). In addition, exemplary embodiments of the present invention may previously ensure an expected location of the mobile device according to change in an environment such as a motion orbit of a satellite, speed and a direction of the vehicle, and a height of a building, position accuracy with respect to various changes in the environment can be improved in real time.

Therefore, exemplary embodiments of the present invention implement an optimal environment for supporting the LBS in a mobile device to improve convenience of a user, usability and competitive force of the mobile device. Exemplary embodiments of present invention may be implemented in various types of mobile devices and various corresponding devices.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of providing location information in a mobile device, the method comprising:
    acquiring initial location information of the mobile device when a location based service is executed;
    transmitting the acquired initial location information to a server;
    receiving auxiliary data corresponding to the initial location information from the server;
    classifying satellites to be used to determine a location with reference to the auxiliary data; and
    determining the location based on a satellite signal of a satellite having a high weight through the classification of the satellites,
    wherein the determining of the location comprises:
        determining whether a sight line ensuring satellite among the classified satellites satisfies a minimum threshold necessary to determine the location;
        determining the location by the sight line ensuring satellite when the sight line ensuring satellite satisfies the minimum threshold;
        determining the location according to weights of the sight line ensuring satellite and a sight line non-ensuring satellite when the sight line ensuring satellite does not satisfy the minimum threshold;
        excluding a satellite signal of the sight line non-ensuring satellite to determine the location when the number of sight line ensuring satellites is sufficient to determine the location; and
        performing positioning with respect to a current location of the mobile device using a satellite signal of the sight line ensuring satellite.

2. The method of claim 1, wherein the classifying of the satellites comprises:
    generating weight adjustment information with reference to the auxiliary data;
    adjusting weights by the satellites using the weight adjustment information; and
    identifying a preference of the satellites according to the weights of the satellites according to the adjustments of the weights.

3. The method of claim 1, wherein the initial location information is acquired using at least one of a location value acquired using a base station signal, a location value acquired using wireless Access Point (AP) received through a Wi-Fi Positioning Service (WPS), and a location value acquired from a fixed Global Navigation Satellite System (GNSS).

4. The method of claim 1, wherein the auxiliary data comprises information on at least one of a location, an area, a height, and light reflectivity of the buildings, three-Dimensional (3D) building information, and information on peripheral topography objects associated with peripheral buildings based on a current location of the mobile device.

5. The method of claim 1, wherein the receiving of the auxiliary data comprises:
   determining whether there is mapping information corresponding to the initial location information;
   determining the location corresponding the mapping information when there is mapping information corresponding to the initial location information; and
   transmitting the initial location information to the server to request the auxiliary data when there is not mapping information corresponding to the initial location information.

6. A method of providing location information in a mobile device, the method comprising:
   acquiring initial location information of the mobile device when a location based service is executed;
   transmitting the acquired initial location information to a server;
   receiving auxiliary data corresponding to the initial location information from the server;
   classifying satellites to be used to determine a location with reference to the auxiliary data; and
   determining the location based on a satellite signal of a satellite having a high weight through the classification of the satellites,
   wherein the classifying of the satellites comprises:
      generating weight adjustment information with reference to the auxiliary data;
      adjusting weights by the satellites using the weight adjustment information; and
      identifying a preference of the satellites according to the weights of the satellites according to the adjustments of the weights, and
   wherein the generating of the weight adjustment information comprises:
      generating satellite information according to a sight line ensuring satellite in which a line of sight is ensure and a sight line non-ensuring satellite to which a multi-path signal is transferred; and
      determining a density of peripheral buildings from the auxiliary data to generate density information.

7. The method of claim 6, wherein the adjusting of the weights comprises:
   allocating a higher weight to a satellite signal of a sight line ensuring satellite; and
   allocating a lower weight to a satellite signal of a sight line non-ensuring satellite received through a multi-path with reference to satellite information and density information according to the weight adjustment information.

8. The method of claim 1, further comprising:
   processing a function operation according to the location based service based on the determined location when the determination of the location is terminated; and
   updating a database using relation information used to determine the location.

9. The method of claim 8, wherein the updating of the database comprises making and updating a database of the initial location information, auxiliary data received from the server, weight adjustment information, and satellite information determined with reference to the auxiliary data and the weight adjustment information in a mapping table.

10. The method of claim 1, further comprising:
    determining a moving distance according to movement of the mobile device to determine whether the moving distance is equal to or greater than a reach threshold to a support radius of a currently connected server;
    determining an expected moving location of the mobile device when the moving distance is equal to or greater than the reach threshold;
    estimating location information of the expected moving location of the mobile device;
    determining whether there is mapping information corresponding to the estimated location information;
    performing location positioning using the mapping information when there is mapping information corresponding to the estimated location information;
    connecting with a service of the estimated location information to acquire the auxiliary data when there is no mapping information corresponding to the estimated location information; and
    performing the location positioning using the acquired auxiliary data.

11. A mobile device comprising:
    a location determination module for receiving a satellite signal to acquire initial location information of the mobile device and to position a location of the mobile device;
    a radio frequency communication unit for processing transmission of the initial location information and reception of auxiliary data corresponding to the initial location information;
    a memory for storing relation information and a threshold necessary to determine a location; and
    a controller for acquiring the auxiliary data corresponding to the initial location information of the mobile device, for classifying satellites to be used to determine a location with reference to the auxiliary data, and for controlling determination of the location based on a satellite signal of a satellite having a high weight through the classification of the satellites,
    wherein the controller comprises a weight determination module for generating weight adjustment information using the auxiliary data received through the radio frequency communication unit, and
    wherein the weight determination module comprises:
       a satellite filter for generating satellite information according to a sight line ensuring satellite in which a line of sight is ensure and a sight line non-ensuring satellite to which a multi-path signal is transferred; and
       a density determination unit for determining a density of peripheral buildings corresponding to the initial location information using the auxiliary data.

12. The method of claim 11, wherein the controller generates weight adjustment information with reference to the auxiliary data, adjusts weights by the satellites using the weight adjustment information, and determines a preference of the satellites according to weights by the satellites.

13. The mobile device of claim 11, wherein the satellite filter matches vector information between satellites and auxiliary data with a current location of the mobile device to identify weight of a sight line ensuring satellite and a non-ensuring satellite in the current location of the mobile device.

* * * * *